United States Patent [19]

Suzuki et al.

[11] 4,116,098
[45] Sep. 26, 1978

[54] GANG SLITTING MACHINE

[75] Inventors: Takashi Suzuki, Sagamihara; Tsutomu Ikezawa, Yokohama; Kazui Ogasawara, Isehara, all of Japan

[73] Assignee: Amada Company, Limited, Japan

[21] Appl. No.: 778,107

[22] Filed: Mar. 16, 1977

[30] Foreign Application Priority Data

Mar. 17, 1976 [JP] Japan .................................. 51-28916

[51] Int. Cl.² .......................... B26D 1/24; B26D 7/26
[52] U.S. Cl. .................................. 83/425.4; 83/499; 83/481; 83/500; 93/58.2 R
[58] Field of Search ................. 83/102, 105, 107, 165, 83/425.2, 481, 482, 498, 499, 500, 508.3, 425.4; 93/58.2 R

[56] References Cited

U.S. PATENT DOCUMENTS 3,257,882  6/1966  Lulie et al. ............................ 83/499

FOREIGN PATENT DOCUMENTS

476,289  7/1915  France ....................................... 83/500

Primary Examiner—Willie G. Abercrombie
Attorney, Agent, or Firm—Wigman & Cohen

[57] ABSTRACT

A rotary shearing apparatus for slitting sheet material into a plurality of strips of predetermined width is disclosed. The apparatus comprises a plurality of tool carriages each having upper and lower tool-holding members supporting upper and lower shearing tools, respectively, and mounted for axial movement in a machine frame for ease of positioning of the tool carriages and replacement of the shearing tools when necessary. Mechanisms are provided for adjusting the vertical overlap of the shearing tools and for automatically moving the tool carriages independently of one another at high or low speed to vary the spacing between the tool carriages and thereby adjust the width of the strips to be slit from the sheet material.

10 Claims, 6 Drawing Figures

GANG SLITTING MACHINE

BACKGROUND OF THE INVENTION

1. Field of the Invention

The present invention relates to a rotary shearing machine which has upper and lower shearing disks or rotary tools for shearing sheet materials such as sheet metals therebetween, and more particularly to a so-called gang slitting machine which has a plurality of pairs of upper and lower rotary shearing tools so as to slit sheet materials such as sheet metals into narrower strips of desired width.

2. Description of the Prior Art

The so-called gang slitting machines are provided with a plurality of pairs of upper and lower disk-like shearing tools which are formed at their peripheries with cutting edges and are designed to be rotated like wheels. The upper shearing tools and the lower shearing tools are aligned to be rotated around horizontal upper and lower axes, respectively, in a manner such that each upper shearing tool and each lower shearing tool cooperate with each other. Thus, the upper and lower shearing tools are designed to cooperate with one another to slit a wide sheet material into narrower strips. Since the widths of the strips to be made depend upon the axial or horizontal lengths or distances between the pairs of the upper and lower shearing tools, all the shearing tools are so designed as to be axially or horizontally adjusted by placing, for example, spacers therebetween so as to slit the sheet material into strips of desired width.

In conventional gang slitting machines, the upper and the lower shearing tools are mounted on two parallel elongated shafts or arbors which are supported only at their ends by and between side frames of the machine.

Accordingly, one of fundamental disadvantages with the conventional gang slitting machines has been that it is very troublesome and time-consuming to set and reset the shearing tools onto and from the shafts or arbors holding them. When it is necessary to change or reset the shearing tools in the conventional gang slitting machines, it has been necessary to remove the long and heavy shafts from the machine and then detach many of the shearing tools axially from the ends of the shafts and finally re-position the shafts onto the machine. Also, even if only one of the shearing tools is damaged and is required to be replaced, for example, it has been necessary to remove the entire shaft supporting the damaged shearing tool from the machine and then detach many sound tools axially from the shaft to take out the damaged tool.

The greatest disadvantage of the conventional gang slitting machines, has been the troublesome and time-consuming effort required, each time it is necessary to adjust or change the axial lengths or distances between the pairs of the upper and lower shearing tools according to the widths of strips to be slit from sheet metals or worksheets. In order to adjust the axial lengths between the shearing tools for desired widths of strips to be slit, it has been necessary to remove and re-position both of the upper and lower shafts holding the tools from and onto the machine so as to place spacers of desired thickness between the shearing tools. Since it is very frequently needed to adjust or change the axial lengths between the shearing tools for various widths of strips to be slit, this troublesome and time-consuming effort has been very often required in the conventional gang slitting machines.

Another disadvantage with the conventional gang slitting machines has been the fact that the upper and lower shafts or arbors holding the shearing tools will be bent in opposite directions away from each other owing to the shearing reaction during shearing operations. Accordingly, the shearing tools could not be kept normal to the worksheet to be slit during shearing operations. As a result, accurate shearing could not be performed and also the shearing tools have been liable to earlier and more frequent damage in the conventional gang slitting machines.

In addition to the above, the conventional gang slitting machines have suffered from various shortcomings, and especially there has been no gang slitting machine that can be fully automatically operated.

SUMMARY OF THE INVENTION

It is an object of the present invention to provide a gang slitting machine in which each of the shearing tools can be easily fixed and detached.

It is another object of the present invention to provide a gang slitting machine in which each of the shearing tools is kept normal to sheet metals or worksheets to be slit during shearing operations.

Basically, these objects are accomplished by providing each of the shearing tools with an individual rotary shaft.

It is a further object of the present invention to provide a gang slitting machine in which the axial lengths or distances between the pairs of the upper and lower shearing tools can be easily adjusted or changed according to the widths of strips to be slit from worksheets.

Basically, this object is accomplished by setting each of the pairs of the upper and lower shearing tools integrally on a carriage which is movable in the axial directions of the shearing tools and by providing a plurality of such carriages.

Accordingly, it is another object of the present invention to provide a gang slitting machine with carriages, each of which holds a pair of the upper and lower shearing tools integrally in a manner enabling them to perform shearing operations and is designed to be moved in the axial directions of the shearing tools.

In this connection, it is another object of the present invention to provide a device for driving the upper and lower shearing tools held by the movable carriages.

It is also an object of the present invention to provide a gang slitting machine in which the vertical overlaps of the upper and lower shearing tools held by the movable carriages can be easily adjusted according to the thickness and the nature of the worksheets to be slit.

It is a further object of the present invention to provide a gang slitting machine in which the carriages holding the upper and the lower shearing tools can be easily moved in the axial directions of the shearing tools and be locked at any desired position so as to adjust or change the lengths or distances between the pairs of the upper and lower shearing tools according to the widths of strips to be slit from sheet materials or worksheets.

It is a still further object of the present invention to provide a gang slitting machine in which the carriages holding the upper and lower shearing tools can be automatically moved either at high speed or at low speed to be accurately and efficiently positioned at any desired positions.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Referring now to the accompanying drawings, a gang slitting machine generally designated by the numeral 1 comprises substantially L-shaped upright sides 3 and 5 which are fixedly connected with each other by a horizontal overhead beam 7 and vertical front and rear supporting plates 9 and 11. A plate 13 horizontally spanning over the front supporting plate 9 further connects the upright sides 3 and 5 and also comprises a work table. Thus, the frame of the gang slitting machine 1 according to the present invention consists of the right and left upright sides 3 and 5, the front and rear supporting plates 9 and 11 and the work table 13.

Figure 3:
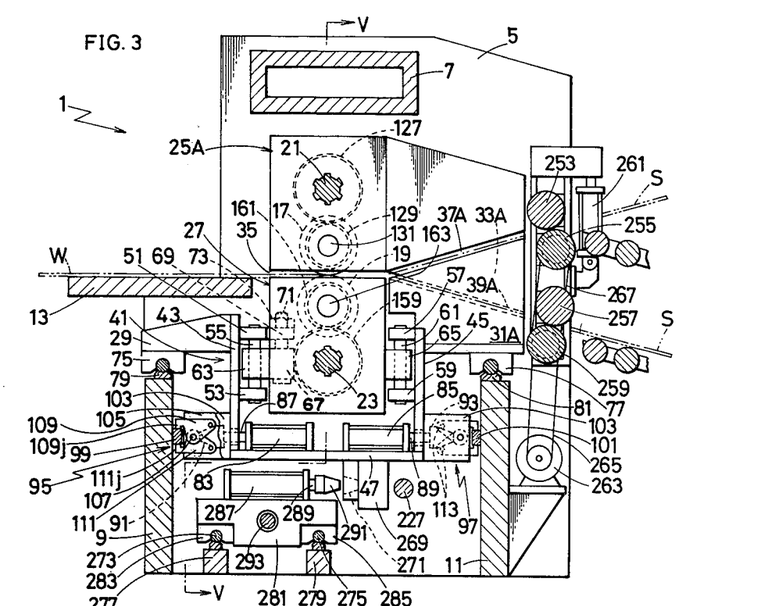
FIG. 3 is a vertical sectional view taken along the line III—III of FIG. 1.

As seen from the drawings and described in detail hereinafter, a plurality of tool carriages 15A, 15B each carrying a pair of upper and lower rotary shearing tools 17 and 19 of disk-like shapes are mounted on and between the front and rear supporting plates 9 and 11 in a manner spanning therebetween so as to be horizontally movable between the upright sides 3 and 5. In the preferred embodiments, there are provided six of the tool carriages 15A, 15B. As best shown in FIG. 3, the sheet metal or worksheet W to be sheared is fed from the work table 13 into the tool carriages 15A, 15B and is slit into a plurality of strips S between the tool carriages 15A, 15B by the upper and lower shearing tools 17 and 19.

Thus, the basic feature of the gang slitting machine according to the present invention is that a plurality of pairs of the upper and lower rotary shearing tools 17 and 19 for shearing sheet metals or worksheets are each held by the tool carriages 15A, 15B and these carriages are horizontally movable in the axial directions of the shearing tools 17 and 19 so as to determine the widths of the strips to be slit from the worksheets.

The upper shearing tools 17 and the lower shearing tools 19 are driven in a manner more fully described in detail hereinafter by rigid elongated upper and lower driving shafts 21 and 23, respectively, which are horizontally and rotatably mounted between the upright sides 3 and 5 so as to extend through the bodies of the tool carriages 15A, 15B. Each of the driving shafts 21 and 23 is a spline shaft so that each of the tool carriages 15A, 15B may be horizontally moved along the tops of the front and rear supporting plates 9 and 11. Preferably, each of the driving shafts 21 and 23 may be of a ball spline shaft which is provided with ball bearings to enable the tool carriages 15A, 15B to horizontally slide more easily therealong.

Figure 1:
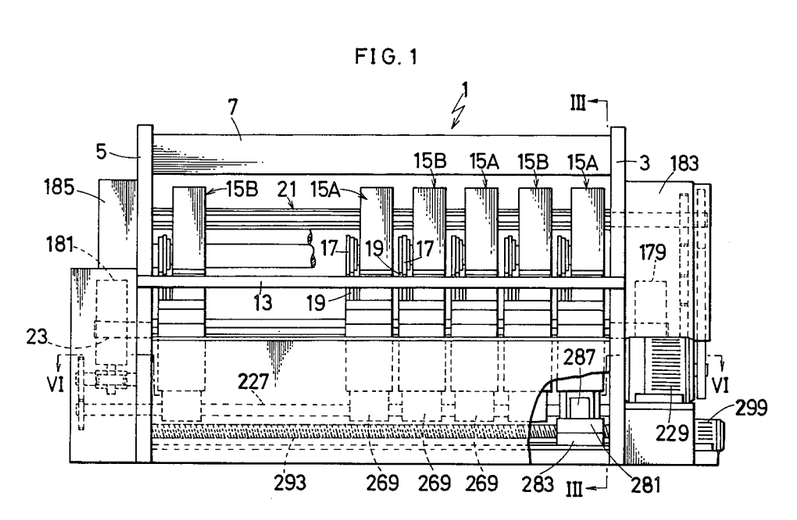
FIG. 1 is a front view of a gang slitting machine according to the present invention with parts broken away for clarity.
Figure 4:
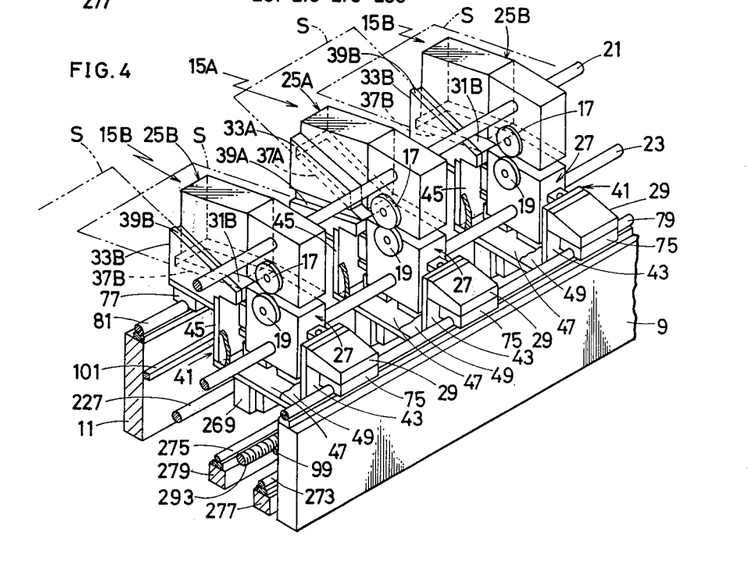
FIG. 4 is an isometric view showing the major portions of the gang slitting machine according to the present invention which, for the purpose of clarity, have not necessarily been shown as strictly coinciding with corresponding portions shown in other drawings.

As shown in FIGS. 1 and 4, all the tool carriages 15A, 15B are of substantially similar construction, but there are provided two types as distinguished by the two different numerals or designations 15A and 15B. The two types of the tool carriages 15A and 15B are different from each other only in the manner in which the upper and lower shearing tools 17 and 19 are held. Each of the tool carriages 15A is designed to hold the upper shearing tool 17 outside the lower shearing tool 19, that is, to hold the lower shearing tool 19 much closer to the carriage than the upper shearing tool 17. On the other hand, each of the tool carriages 15B is constructed to hold the upper shearing tool 17 inside the lower shearing tool 19, that is, much closer to the carriage than the lower shearing 19. Thus, the two types of tool carriages 15A and 15B are different from each other in that their upper and lower shearing tools 17 and 19 are differently mounted with regard to the vertical shearing plane where the shearing is performed by these tools. The two types of the tool carriages 15A and 15B of such constructions are alternately mounted on and between the front and rear supporting plates 9 and 11.

The purpose of alternately mounting the two types of the tool carriages 15A and 15B which differ from each other in the manner of holding the upper and lower shearing tools 17 and 19 is to enable both edges of each strip S slit from the worksheet W to proceed in the same direction, since, in shearing, the upper shearing tool 17 will push down the worksheet W by its peripheral surface while the lower shearing tool 19 push up the same. It will be understood that both edges of each strip S to be slit from the worksheet W between the tool carriages 15A and 15B will thus be pressed in the same direction, either downward by the peripheral surfaces of two adjacent upper shearing tools 17 or upward by the peripheral surfaces of two adjacent lower shearing tools 19.

The constructions of the tool carriages 15A, 15B are best shown in FIGS. 3 and 4. Although one of the tool carriages 15A is shown in FIG. 3, each of the tool carriages 15B is also substantially of the same construction. Either of the tool carriages 15A and 15B is a substantially C-shaped frame comprising an upper tool-holding member 25A, 25B having a front box-like portion for holding the upper shearing tool 17, a box-like lower tool-holding member 27 for holding the lower shearing tool 19, a front support member 29, a rear support member 31A, 31B and a substantially triangular upright support member 33A, 33B mounted integral with the rear support member 31A, 31B and supporting fixedly the upper tool-holding member 25A, 25B. The upper tool-holding member 25A, 25B is so supported by the upright support member 33A, 33B as to form an opening 35 over both of the lower tool-holding member 27 and the rear support member 31A, 31B. The worksheet W is fed from the work table 13 into the opening 35 between the upper and lower tool-holding members 25A, 25B and 27 and is slit into a plurality of strips S by the upper and lower shearing tools 17 and 19. It will be understood that a portion of the worksheet W being sheared by a certain pair of the upper and lower shearing tools 17 and 19 will be divided into two pieces, one of which will proceed between the upper and lower tool-holding members 25A, 25B and 27 and the other of which will extend outside of the tool carriage 15A, 15B, since the upper and lower shearing tools 17 and 19 are located at the side of the tool carrige 15A, 15B.

Except that the upper and lower shearing tools 17 and 19 are supported in different ways, the tool carriages 15A and 15B are different from each other only in the constructions of the rear portion of the upper tool-holding member 25A, 25B, the rear support member 31A, 31B and the upright support member 33A, 33B. Such differences of the constructions have been made only in order to enable the strips S slit from the worksheet W to easily proceed outward from the gang slitting machine 1, since the strips S will have a tendency to go either upward or downward depending upon the manner in which the upper and lower shearing tools 17 and 19 are held.

In the tool carriage 15A shown in FIG. 3 and holding the upper shearing tool 17 outside the lower shearing tool 19, a portion of the worksheet W being fed inside the vertical shearing plane of the upper and lower shearing tools 17 and 19, namely, between the upper and lower tool-holding members 25A and 27 will be pressed upward by the peripheral surface of the lower shearing tool 17 and accordingly has a tendency to proceed upwardly, after being sheared, while a portion of the worksheet W being outside the vertical shearing plane of the upper and lower shearing tools 17 and 19 will be pressed downwardly by the peripheral surface of the upper shearing tool 17 and has a tendency to go downward after being sheared. For this reason, the tool carriage 15A is so constructed that the top surface of the rear support member 31A adjoining the top surface of the lower tool-holding member 27 is formed to be an ascending slope 37A and the rear bottom of the upper tool-holding member 25A is also correspondingly formed ascending so as to provide a passage for ascending strips S. Also, for strips S proceeding downwardly outside the shearing plane of the upper and lower shearing tools 17 and 19, a groove having a descending slope 39A is formed on the outer side of the rear support member 31A. In order not to block the path of the strips S proceeding after being sheared from the worksheet W, both of the adjacent edges of the ascending slope 37A and the descending slope 39A are aligned or coincide with the vertical shearing plane where the cooperating shearing edges of the upper and lower shearing tools 17 and 19 are engaged with each other and the shearing is performed.

On the other hand, in the tool carriage 15B holding the upper shearing tool 17 inside the lower shearing tool 19, a portion of the worksheet W being fed inside the vertical shearing plane of the upper and lower shearing tools 17 and 19, namely, between the upper and lower shearing tools 17 and 19 will be pressed downward by the peripheral surface of the upper shearing tool 17 and accordingly has a tendency to proceed downward after being sheared, while a portion of the worksheet W being fed outside the shearing plane of the upper and lower shearing tools 17 and 19 will be pressed upward by the peripheral surface of the lower shearing tool 19 and will go upward after being sheared. Therefore, the tool carriage 15B is so constructed that the top surface of the rear support member 31B adjoining the top surface of the lower tool-holding member 27 is formed to be a descending slope 37B and the rear bottom of the upper tool-holding member 25B overhanging the rear support member 31B is also correspondingly formed descending so as to provide a passage for descending strips S. Also, the upright support member 33B of the tool carriage 15B is provided at its top with an ascending slope 39B so as to provide a passage for the ascending strips S. In order to enable the strips S to proceed after being sheared for the worksheet W, each of the descending slope 37B and the ascending slope 39B is so arranged as to be of a width extending breadthwise to and beyond the vertical shearing plane of the upper and lower shearing tools 17 and 19.

Thus, it will now be understood that the worksheet W is fed from the work table 13 into the tool carriages 15A and 15B and sheared by the upper and lower shearing tools 17 and 19 into a plurality of strips S and carried outward as shown by the phantom lines in FIG. 4, since the two types of the tool carriages 15A and 15B are alternately mounted.

As shown in FIGS. 3 and 4, the front support member 29 and the rear support member 31A, 31B of each of the tool carriages 15A and 15B are fixedly connected with each other by a substantially box-like frame 41 comprising a vertical front plate 43 secured to the inner vertical face of the front support member 29, a vertical rear plate 45 secured to the rear support member 31A, 31B, a horizontal bottom plate 47 connecting fixedly the lower ends of the front and rear plates 43 and 45 and a vertical side plate 49 fixedly connecting the side ends of the front and rear plates 43 and 45 and the bottom plates 47. Each of the box-like frames 41 of the tool carriages 15A and 15B is of a rigid construction, and thus the tool carriages 15A and 15b are spanned between the front and rear supporting plates 9 and 11.

The lower tool-holding member 27 of each of the tool carriages 15A and 15B is vertically movably mounted in the box-like frame 41 consisting of the front plate 43, the rear plate 45, the bottom plate 47 and the side plate 49 as described above. The purpose of thus vertically movably mounting the lower tool-holding members 27 is to adjust the vertical overlaps of the shearing edges of the cooperating upper and lower shearing tools 17 and 19 depending upon the thickness and the nature of the worksheets W to be slit. As shown in FIG. 3, each of the front plates 43 of the box-like frames 41 is provided at its vertical surface with two vertically spaced horizontal projections 51 and 53 between which a guide bar 55 having a round section is vertically secured, and similarly each of the rear plates 45 of the box-like frames 41 is provided at its vertical surface with two vertically spaced horizontal projections 57 and 59 between which a round guide bar 61 is vertically secured in parallel with the guide bar 55. Each of the box-like lower tool-holding members 27 is provided at its front and rear vertical surfaces with horizontal arms 63 and 65, respectively, having vertically formed bores. Thus, each of the lower tool-holding members 27 is so disposed between the front and rear support members 29 and 31A, 31B so that the shearing edge of the lower shearing tool 19 held thereby will align with the shearing edge of the upper shearing tool 17 face to face on the vertical shearing plane. As will be described in detail hereinafter, all the lower tool-holding members 27 are so designed as to be vertically adjustable along the guide bars 55 and 61 so as to adjust the vertical overlaps of the upper and lower shearing tools 17 and 19.

In the preferred embodiment, each of the lower tool-holding members 27 is vertically adjustably held in the box-like frame 41 as shown in FIG. 3 by the phantom lines. As seen from the figure, a horizontal projection 67 having a vertical bore is provided on a side portion of each of the lower tool-holding members 27, while another horizontal projection 69 having a vertically formed bore is provided on a portion of each of the front plates 43 or their upper projections 51 of the box-like frames 41 in a manner such that its vertical bore is vertically aligned with that of the horizontal projection 67. Also, a supporting bar 71 having a threaded top end and a flanged lower end is vertically inserted through the vertically aligned bores of the projections 67 and 69 in a manner such that its threaded top end will project from the upper projection 69, and a nut 73 is engaged with the threaded top portion of the supporting bar 71. Thus, each of the tool-holding members 27 is held at any desired vertical position in the box-like frame 41 by the horizontal projection 69 by means of the nut 73, the supporting bar 71 and the horizontal projection 67.

Each of the tool carriages 15A, 15B is provided at its front and rear foot portions with slide members 75 and 77, respectively, which are fixed integrally with the bottoms of the front support member 29 and both of the rear support member 31A, 31B and the upright support member 33A, 33B, respectively. Rails 79 and 81 are provided on the tops of the front and rear supporting plates 9 and 11, respectively, so that the slide members 75 and 77 may be slidably mounted thereon. Thus, the tool carriages 15A, 15B can be horizontally moved on and along the front and rear supporting plates 9 and 11 in order to adjust the axial lengths or distances between the pairs of the mating upper and lower shearing tools 17 and 19 for the purpose of determining the widths of the strips S to be slit from the worksheet W.

As shown in FIG. 3, in order to lock each of the tool carriages 15A, 15B at a desired horizontal position, each of the box-like frames 41 thereof is equipped with two identical hydraulic motors or cylinders 83 and 85 having piston rods 87 and 89, respectively, such piston rods 87 and 89 having frusto-conical ends 91 and 93, respectively, and two identical locking means generally designated by the numerals 95 and 97. The front and rear supporting plates 9 and 11 are provided at their inner vertical faces with square-section bar members 99 and 101, respectively, horizontally fixed thereto. The hydraulic cylinder 83 is horizontally mounted on the bottom plate 47 of each of the box-like frames 41 close to the front plate 43 thereof and at right angles thereto so that its piston rod 87 will project outwardly through an opening formed through the front plate 43. Likewise, the hydraulic cylinder 85 is mounted close to the rear plate 45 of each of the box-like frames 41 symmetrically with the cylinder 83 so that its piston rod 89 will project outwardly through an opening formed through the rear plate 45. A locking means 95 is fixedly mounted onto the outer side of each of the front plates 43 where the piston rod 87 of the hydraulic cylinder 83 will project so that it may cooperate with the square-sectioned bar member 99 in a manner to be described hereinafter. Also, a locking means 97 is likewise mounted onto the outer side of each of the rear plates 45 where the piston rod 89 of the hydraulic motor or cylinder 85 will project so that it may cooperate with the square-sectioned bar member 101.

The locking means 95 and 97 for locking the tool carriages 15A, 15B are all the same in construction, and each of them comprises two vertical plates 103 and 105 secured as a pair to the box-like frame 41, a hinge pin 107 horizontally spanned between the vertical plates 103 and 105 and two lever or bell crank means 109 and 111 which are symmetrically pivoted on the hinge pin 107 somewhat like a pair of pliers. The bell crank means 109 and 111 are formed at their outer ends with crooked jaw portions 109j and 111j, respectively, and also each of the bell crank meas 109 and 111 is provided at its inner end with a horizontal pin 113 fixed thereto. See, e.g., locking means 97 and pins 113 shown in phantom in FIG. 3. Thus, when the piston rods 87 and 89 are extended out of the hydraulic motor or cylinders 83 and 85 to bring their frusto-conical ends between the horizontal pins 113 of the bell crank means 109 and 111 of the locking means 95 and 97, the bell crank means 109 and 111 will be swung around the hinge pin 107 and cause their crooked jaw portions 109j and 111j to grip the horizontal square-section bar members 99 and 109 secured to the front and rear supporting plates 9 and 11. Thus, it will now be understood that each of the tool carriages 15A and 15B can be locked by the locking means 95 and 97 at any desired position on the front and rear supporting plates 9 and 11 by supplying the hydraulic motors or cylinders 83 and 85 with hydraulic fluid.

Figure 5:
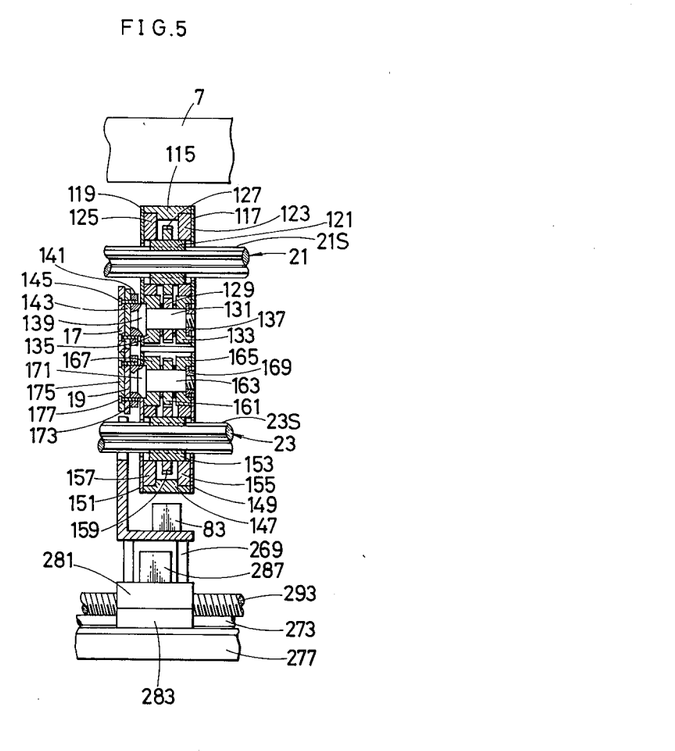
FIG. 5 is a vertical sectional view taken along the line V—V of FIG. 3.

Referring to FIG. 5, the inner construction of each of the tool carriages 15A and 15B includes upper and lower driving mechanisms for driving the upper and lower shearing tools 17 and 19, respectively. As will be readily understood, the upper and lower driving mechanisms for the upper and lower shearing tools 17 and 19 are enclosed within the upper and lower tool-holding members 25A, 25B and 27, respectively, of each of the tool carriages 15A, 15B. Although FIG. 5 shows the driving mechanisms of one of the tool carriages 15A, all the tool carriages 15A are the same in construction, and also the tool carriages 15B are of the same construction as the tool carriages 15A except that they hold the upper and lower shearing tools 17 and 19 differently, as has been described hereinbefore. Also, as seen from FIG. 5, the upper and lower driving mechanisms enclosed in the upper and lower tool-holding members 25A, 25B and 27, respectively, are similar or identical to each other except that all the elements or components of both of them are symmetrically disposed.

Each of the upper tool-holding members 25A, 25B includes a casing comprising a frame 115 and side plates 117 and 119, and the upper driving shaft 21, which has been hereinbefore described as spanning between the upright sides 3 and 5 of the gang slitting machine 1, extends through the upper portions of the upper tool-holding members 25A and 25B. As has been described, the driving shaft 21 is of a spline shaft that is preferably a ball spline shaft so as to enable the tool carriages 25A and 25B to move axially therealong, and therefore it is formed at its peripheries with a plurality of axial grooves or splines 21S. Also, the upper driving shaft 21 is engaged or enclosed by a rotary member 121 which is provided at its inside periphery with a plurality of axial grooves or splines engaging with the splines 21S of the driving shaft 21 and is journaled in bearing members 123 and 125 symmmetrically fixed to the side plates 117 and 119 of the upper tool-holding member 25A, 25B. The rotary member 121 is provided at its mid-axial periphery with a gear 127 radially fixed thereto and is freely axially movable along the splines 21S of the upper driving shaft 21. The gear 127 engages with another gear 129 which is located immediately thereunder and is radially fixed to and around a freely rotatable shaft 131 for the upper shearing tool 17. The shaft 131 is rotatably journaled in bearing members 133 and 135 symmetrically fixed to the side plates 117 and 119, respectively. One end of the shaft 131 projects out from the bearing member 133 and is threaded and engaged by a nut 137, and the other end of the same projects out from the bearing member 135 and is formed with a flange 139 projecting further out of the side plate 119. Thus, the shaft 131 is held in position in the bearing members 133 and 135 by the nut 137. Also, a disk-like portion or member 141 is formed or provided at the outermost end of the shaft 131 projecting out from the side plate 119. Thus, the upper shearing tool 17 is detachably fixed to the disk-like portion or member 141 of the shaft 131 together with a disk-like roll member 143 by a plurality of bolts 145. The disk-like roll member 143 is so arranged as to vertically align with the lower shearing tool 19.

In the above described arrangements, the types 15A and 15B of the tool carriages are different from each other in that upper shearing tool 17 is held on the outer side of the disk-like roll member 143 in the type 15A as shown in FIG. 5 while it is disposed on the inner side of the disk-like roll member 143 in the type 15B. Also, a spacer or spacers (not shown) may be inserted between the shearing tool and the disk-like roll member 143 and/or the disk-like portion or member 141 of the shaft 131 so as to adjust the horizontal distance or clearance between the upper and lower shearing tools 17 and 19 according to the thickness or nature of the worksheet W to be slitted. Thus, in will now be understood that the upper shearing tool 17 is driven with the rotation of the upper driving shaft 21 and all the tool carriages 15A and 15B can be horizontally moved along the driving shaft 21.

As seen from FIG. 5, each of the lower tool-holding members 27 is of a construction similar to those of the upper tool-holding members 25A and 25B and is constructed of the same elements or components as those of the upper tool-holding members 25A and 25B. As has been hereinbefore mentioned, however, generally all the elements or components in the lower tool-holding members 27 are symmetrically placed or reversed with regard to those of the upper tool-holding members 25A and 25B.

Like the upper tool-holding members 25A and 25B, each of the lower tool-holding members 27 is of a casing comprising a frame 147 and side plates 149 and 151. However, the lower driving shaft 23, which is also a spline shaft having a plurality of splines 23S, extends through the lower portions of the lower tool-holding members 27. The lower driving shaft 23 is engaged and enclosed by a rotary member 153 which is journaled in bearing members 155 and 157 fixed to the side plates 149 and 151, respectively, of the lower tool-holding member 27. A gear 159 is fixedly provided at the mid-axial periphery of the rotary member 153 and it is engaged with another gear 161 which is located just thereover and is coaxially fixed to and around a shaft 163 for the lower shearing tool 19. The shaft 163 is freely rotatably journaled in bearing members 165 and 167 fixed to the side plates 149 and 151, respectively. Just in the same manner as the shaft 131 of the upper shearing tool 17, the shaft 163 is provided with a nut 169 and a flange 171 and is held in position by the nut 169, and it is also provided at its outermost end with a disk-like portion or member 173. Also, the lower shearing tool 19 is detachably fixed to the disk-like portion or member 173 of the shaft 163 together with a disk-like roll member 175 by a plurality of bolts 177. As will now be readily understood, the lower shearing tool 19 is held on the inner side of the disk-like roll member 175 in the tool carriage 15A as shown in FIG. 5, while it is held on the outer side of the same in the tool carriage 15B. In the same manner as the upper tool-holding members 25A and 25B, one or more spacers (not shown) may be placed between the lower shearing tool 19 and the disk-like roll member 175 and/or the disk-like portion or member 173 of the shaft 163 so as to adjust the axial or horizontal distance or clearance between the upper and lower shearing tools 17 and 19.

It will now be easily understood that all the tool carriages 15A and 15B can be moved on and along the front and rear supporting plates 9 and 11 while slidably gripping the upper and lower driving spline shafts 21 and 23 and can be driven by the shafts 21 and 23 at any desired positions on the front and rear supporting plates 9 and 11.

Also, it is a unique feature of the present invention that the upper and lower shearing tools 17 and 19 and the disk-like roll members 143 and 175 can be easily removed from their shafts 131 and 163 by loosening the bolts 145 and 177. Accordingly, the axial or horizontal distance or clearance between the upper and lower shearing tools 17 and 19 can be also easily adjusted according to the thickness and material of the worksheet W to be slit by using the spacers in the above described manner. Of course, such a spacer or spacers may be used in either or both of the upper and lower tool-holding members 25A, 25B and 27.

Figure 2:
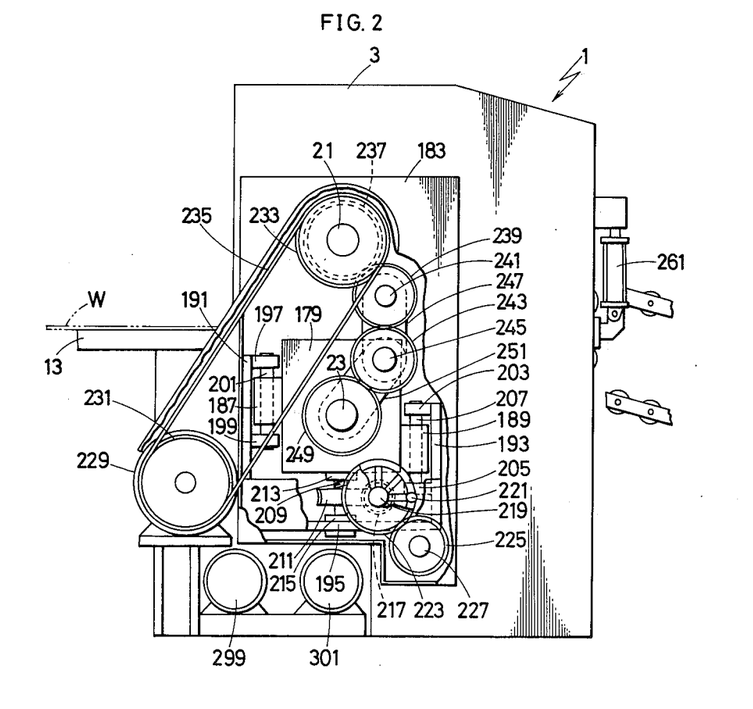
FIG. 2 is a side elevational view of the gang slitting machine shown in FIG. 1 with parts broken away for clarity.

In order to adjust the vertical overlap of the mating upper and lower shearing tools 17 and 19, the lower tool-holding members 27 are so designed as to be vertically raised and lowered by vertically moving the lower driving shaft 23. Although each of the lower tool-holding members 27 is fixed at at any desired vertical position to the box-like frame 41 by any suitable tightening means, such as the supporting bar 71 and the nut 73, it can be vertically moved by vertically moving the lower driving shaft 23 with the tightening means released. As shown in FIGS. 1 and 2, the ends of the lower driving shaft 23 extend out through the upright sides 3 and 5 of the gang slitting machine 1 and are supported by vertically movable supporting members 179 and 181 which are enclosed in housings 183 and 185, respectively. Thus, when the supporting members 179 and 181 are simultaneously moved vertically, the lower driving shaft 23 is also vertically moved parallel to the upper driving shaft 21 to thereby vertically move all the lower tool-holding members 27. Accordingly, in order to adjust the vertical overlaps of the mating upper and lower shearing tools 17 and 19, all the lower tool-holding members 27 can be brought to any desired vertical position by vertically moving the supporting members 179 and 181 simultaneously.

Both of the supporting members 179 and 181 for supporting the lower driving shaft 23 are of the same construction, only the supporting member 179 will be described herein. As shown in FIG. 2, the supporting member 179 is of a square frame and it is provided at its sides with arms 187 and 189 each fixed thereto and having a vertically formed bore at its center. Also, the supporting member 179 is surrounded by parallel front and rear plates 191 and 193 vertically fixed to the upright side 3 of the gang slitting machine 1 and a horizontal bottom plate 195 connecting the lower ends of the front and rear plates 191 and 193. The front plate 191 is provided at its face with parallel upper and lower projections 197 and 199 which are horizontally fixed thereto in a manner extending above and below the arm 187 of the supporting member 179, and a guide bar 201 is vertically provided between the the upper and lower projections 197 and 199 in a manner extending through the vertical bore formed through the arm 187. Similarly, the rear plate 193 is provided at its face with parallel upper and lower projections 203 and 205 which are fixed thereto so as to extend above and below the arm 189, and another guide bar 207 is also vertically provided between the upper and lower projections 203 and 205 and through the bore of the arm 189. The arms 187 and 189 of the supporting member 179 are slidably mounted on and around the guide bars 201 and 207, respectively, and thus the supporting member 179 can be vertically moved along the guide bars 201 and 207. The supporting member 181 is also mounted on the upright side 5 in the same manner.

As shown in FIG. 2, a threaded rod 209 having a gear 211 fixed thereto is vertically provided between the bottom of the supporting member 179 and the horizontal bottom plate 195. The top end of the threaded rod 209 is threaded into a nut 213 fixed to the bottom of the supporting member 179, while the lower end of the same is journaled in a bearing member 215 fixed to the bottom plate 195. Thus, the threaded rod 209 is so designed as to raise and lower the supporting member 179 when the rod 209 is rotated. The gear 211 radially fixed to the threaded rod 209 engages as a worm wheel with a worm 217 which is formed on a shaft 219 horizontally and rotatably mounted. A handwheel 221 is fixed to the outermost end of the shaft 219 of the worm 217. Thus, when the handwheel 221 is rotated to rotate the gear or worm 217, the worm wheel 211 is rotated to enable the threaded rod 209 to raise or lower the supporting member 179.

Figure 6:
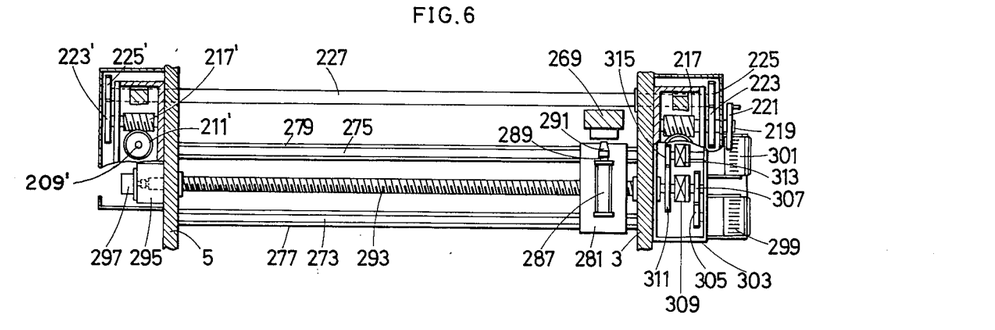
FIG. 6 is a horizontal sectional view taken along the line VI—VI of FIG. 3.

The supporting member 181 provided on the outer side of the upright side 5 is also simultaneously vertically moved in the same manner as the supporting member 179. For this purpose, a gear 223 is coaxially fixed to the shaft 219 of the worm 217 and engages with another gear 225 which is fixed to an elongated shaft 227 connected with the device for vertically moving the supporting member 181. As shown in FIGS. 1 and 6, the shaft 227 having the gear 225 extends horizontally between and through the two upright sides 3 and 5 and is connected with the device for vertically moving the supporting member 181 mounted on the outer side of the upright side 5. It will be seen that the device for vertically moving the supporting member 181 is constructed also of a threaded rod 209', a gear or worm wheel 211', worm 217' and gears 223' and 225' in all the same manner as the device for the supporting member 179. Thus, when the handwheel 221 is rotated in either direction, the shaft 227 is rotated by means of the gears 223 and 225 and at the same time vertically moves the supporting member 181 through the gears 225' and 223', the worm 217', the worm wheel 211' and the threaded rod 209'.

In the above described manner, when the handwheel 221 is rotated, the supporting members 179 and 181 on the both sides of the gang slitting machine 1 are simultaneously raised or lowered to raise or lower the lower driving shaft 23 and accordingly raise or lower all the lower tool-holding members 27 simultaneously. Thus, it will now be understood that the vertical overlap of the mating upper and lower shearing tools 17 and 19 in all the tool carriages 15A and 15B can be easily adjusted by rotating the handwheel 221.

The upper and lower driving shafts 21 and 23 for driving the upper and lower shearing tools 17 and 19, respectively, are driven by a motor 229 which is mounted by the side of the upright side 3 and has a sprocket 231 fixed to its output shaft. For this purpose, the upper and lower driving shafts 21 and 23 are so provided as to project out from the upright side 3 and the supporting member 179, respectively, in the housing 183.

As shown in FIG 2, a sprocket 233 is fixed to the end of the upper driving shaft 21, and a chain 235 is trained about the sprockets 231 and 233 of the motor 229 and the upper driving shaft 21. Of course, another means such as a belt and pulleys may be used instead of the chain 235 and the sprockets 231 and 235. Thus, the upper driving shaft 21 is driven by the sprocket 231 of the motor 229 only by means of the chain 235 and the sprocket 233.

The lower driving shaft 23 is driven by means of the upper driving shaft 21 which is driven in the above described manner. As is also shown in FIG. 2, a gear 237 is coaxially fixed to the end of the upper driving shaft 21 and engages with another gear 239 which is freely rotatable on a shaft 241 provided at a fixed position. The gear 239 also engages with another gear 243 with is freely rotatable on a shaft 245. While the shaft 241 of the gear 239 is provided at a fixed portion of the gang slitting machine 1, the shaft 245 of the gear 243 is pivoted to a free end of a link means 247 which is swingably pivoted on the shaft 241 of the gear 239. The gear 243 engaging with the gear 239, on one hand, engages, on the other hand, with a further gear 249 which is coaxially fixed to the end of the lower driving shaft 23. Also, in order to keep the gears 243 and 249 engaging with each other, another link means 251 is provided to connect the shaft 245 of the gear 243 and the lower driving shaft 23 on which the gear 249 is fixed. Thus, when the lower driving shaft 23 is vertically moved by the supporting member 179, the link means 247 and 251 pivotally holding the shaft 245 of the intermediate gear 243 are swung around the shaft 241 of the gear 231 and the lower driving shaft 23, respectively, with the intermediate gear 243 kept engaged with both of the upper and lower gears 239 and 249. From the above description, it will now be understood that the lower driving shaft 23 is driven by the upper driving shaft 21 simultaneously with the rotation thereof through the gears 237, 239, 243 and 249 but it can be vertically moved with the vertical movement of the supporting members 179 and 181.

As shown in FIG. 3, two pairs of upper and lower pinch rollers 253 and 255 and 257 and 259 are horizontally provided between the upright sides 3 and 5 of the gang slitting machine 1 so as to pull out the strips S slit from the worksheet W and proceeding upward and downward. In the preferred embodiment, the pinch rollers 253 and 257 are urged to the mating pinch rollers 255 and 259, respectively, by a hydraulic motor 261, and the rollers 255 and 259 are rotatably driven by a motor 263 through belts 265 and 267.

As has been hereinbefore described, the tool carriages 15A and 15B are horizontally moved on the front and rear supporting plates 9 and 11 to be positioned according to the widths of the strips S to be slitted from the worksheet W. Of course, the tool carriages 15A and 15B can be manually moved by any suitable means, but they can also be most easily moved in an automatic manner.

As best shown in FIG. 3, each of the tool carriages 15A and 15B is provided at its bottom surface with a depending projection 269 having a frusto-conical hole 271 at its front portion. Guide rails 273 and 275 are fixedly provided in parallel with each other on square-sectioned bar members 277 and 279, respectively, which are horizontally laid under the tool carriages 15A and 15B in parallel with the front and rear supporting plates 9 and 11, and also a movable member 281 having slide members 283 and 285 is freely slidably mounted on the guide rails 273 and 275. Also, a hydraulic motor 287 having a piston rod 289 provided at its end with a frusto-conical member 291 is fixedly mounted on the movable member 281 in a manner enabling its frusto-conical member 192 to be horizontally inserted into the frusto-conical holes 271 of the depending projections 269 of the tool carriages 15A and 15B. Thus, when the frusto-conical member 291 of the piston rod 289 of the hydraulic motor 287 is kept inserted into the frusto-conical hole 271 of the depending projection 269 of any of the tool carriages 15A and 15B by the hydraulic fluid of the hydraulic motor 287, such tool carriage can be moved to any desired position on the front and rear supporting plates 9 and 11 by horizontally moving the movable member 281 on the guide rails 273 and 275.

In order to horizontally move the movable member 281 on the guide rails 273 and 275, a lead screw 293 is so provided as to extend through a threaded bore formed through the central portion of the movable member 281. The lead screw 293 is horizontally extended in parallel with the front and rear supporting plates 9 and 11 and moves the movable member 281 on and along the guide rails 273 and 275 when it is rotated. Thus, when the lead screw 293 is rotated, the movable member 281 is moved on the guide rails 273 and 275 therealong, whether or not it is carrying any of the tool carriages 15A and 15B by means of the insertion of the frusto-conical member 291 of the piston rod 289 into the frusto-conical hole 271 of the depending projection 269 thereof.

As best shown in FIG. 6, one end of the lead screw 293 projects out through the upright side 5 and is journaled in a bearing member 295. Also, the lead screw 293 may be connected at its outermost end with a transducer 297 for transmitting pulses. The other end of the lead screw 293 extends out through the upright side 3 and is adapted to be alternately connected with a high-speed motor 299 or a low-speed motor 301 through a gearbox 303 which is disposed on the outer side of the upright side 3 and encloses, for example, gears 305 and 307, a clutch 309, a gear 311, a clutch 313 and a gear 315. Thus, the lead screw 293 is rotated at high speed by the high-speed motor 299 until the movable member 281 approaches any desired one of the tool carriages 15A and 15B, and is rotated at low speed by the low-speed motor 301 after the movable member 281 is closely positioned to a desired tool carriage. Accordingly, the positioning of the tool carriages 15A and 15B can be made positively and in a time-saving manner according to the widths of the strips S to be slit from the worksheet W.

As is readily apparent to those skilled in the art, the high-speed and low-speed motors 299 and 301 can be automatically operated in connection with the hydraulic motors 287 and 83 and 85 for moving and locking the tool carriages 15A and 15B by using, for example, preset counters and limit switches. Thus, the axial lengths or distances between the pairs of the upper and lower shearing tools 17 and 19 can be fully automatically set according to the widths of the strips to be slit from the worksheet W.

As has been so far described, the shearing tools can be easily set and reset and the axial lengths or distances between the pairs of the mating upper and lower shearing tools 17 and 19 can be most easily determined in the gang slitting machine 1 according to the present invention. Also, since each of the shearing tools is disposed on its individual shaft, they are kept normal to the worksheet W being slit during their shearing operations, and, accordingly, accurate shearing can be performed and damage and wear of the shearing tools characteristic of the prior art devices can be eliminated.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. A gang slitting machine for continuously slitting wide sheet material having a given width into a plurality of narrower width strips comprising side frames, supporting plates mounted to said frames substantially at the front and rear sides thereof and spanning therebetween, a plurality of tool carriages movably mounted on said supporting plates, respective upper and lower tool shafts mounted in each tool carriage independently of the tool shafts of other tool carriages, an upper and a lower rotary shearing tool mounted on said upper and lower tool shafts respectively, means associated with said tool carriages for driving said rotary shearing tools, each tool carriage separately including an upper tool-holding member for supporting said upper shearing tool and upper tool shaft and a lower tool-holding member for supporting said lower shearing tool and lower tool shaft and each tool carriage further including means for vertically moving one of said upper and lower tool-holding members relative to the other tool-holding member.

2. The gang slitting machine according to claim 1, wherein said tool carriages are provided with upwardly sloping surfaces for guiding selected ones of the narrower width strips in a rearwardly and upwardly direction and with downwardly sloping surfaces for guiding other selected ones of the narrower width strips in a rearwardly and downwardly direction.

3. The gang slitting machine according to claim 1, wherein each of said tool carriages includes an upper tool-holding member for supporting said upper shearing tool and upper tool shaft and a lower tool-holding member for supporting said lower shearing tool and lower tool shaft.

4. The gang slitting machine according to claim 1, including means associated with said tool carriages for moving a selected one of said tool carriages along said supporting plates independently of the other tool carriages.

5. The gang slitting machine according to claim 3, wherein said driving means includes upper and lower driving shafts extending through said tool carriages and arranged parallel to a direction of movement of said tool carriages, each of said driving shafts being rotatably mounted at both ends on said frames and means interconnecting said upper and lower driving shafts.

6. The gang slitting machine according to claim 5 wherein said upper driving shaft extends through the upper tool-holding members and said lower driving shaft extends through the lower tool-holding members of said tool carriages, supporting members mounted on said side frames, the ends of at least one of said upper driving shaft and lower driving shaft being rotatably supported by said supporting members and means for vertically moving said supporting members whereby at least one of said upper tool-holding members and lower tool-holding members are simultaneously vertically movable.

7. A gang slitting machine for slitting wide sheet material having a given width into a plurality of narrower width strips comprising side frames, supporting plates mounted on said frames substantially at the front and rear sides thereof and spanning therebetween, a plurality of tool carriages, each tool carriage rotatably supporting an upper and a lower shearing tool independently of the other tool carriages, said tool carriages being movably mounted on said supporting plates for movement in a moving direction, means for driving said rotary shearing tools, bar members mounted on said supporting plates parallel with said moving direction of said tool carriages, locking means on said tool carriages for releasably locking said tool carriages to said bar members, guide rails mounted between said side frames parallel to said moving direction of said tool carriages, a movable member mounted on said guide rails, cylinder means on said movable member, said cylinder means having insertion members for releasably engaging a selected one of said tool carriages, and means for reciprocally moving said movable member along said guide rails.

8. The gang slitting machine according to claim 7 wherein said reciprocal moving means comprises a rotatable lead screw mounted parallel to said guide rails and threadably connected to said movable member, a high-speed motor rotatable at a first speed and a low-speed motor rotatable at a second speed lower than said first speed and clutch means for interconnecting said lead screw to one of said motors.

9. A gang slitting machine for continuously slitting wide sheet material having a given width into a plurality of narrower width strips comprising side frames, supporting plates mounted to said frames substantially at the front and rear sides thereof and spanning therebetween, a plurality of tool carriages movably mounted on said supporting plates, respective upper and lower tool shafts mounted in each tool carriage independently of the tool shafts of other tool carriages, an upper and a lower rotary shearing tool mounted on said upper and lower tool shafts respectively, each of said tool carriages including an upper tool-holding member for supporting said upper shearing tool and upper tool shaft and a lower tool-holding member for supporting said lower shearing tool and the lower tool shaft, means associated with said tool carriages for driving said rotary shearing tools, said driving means including an upper driving shaft extending through said upper tool-holding members and a lower driving shaft extending through said lower tool-holding members, supporting members mounted on said side frames, the ends of at least one of said upper driving shaft and lower driving shaft being rotatably mounted on said supporting members, means for vertically moving said supporting members whereby at least one of said upper tool-holding members and lower tool-holding members are simultaneously vertically movable and means for maintaining said driving shafts in driving engagement with each other when said tool-holding members are simultaneously vertically moved.

10. The gang slitting machine according to claim 17, further including means carried by each tool carriage for vertically moving one of said upper and lower tool-holding members relative to the other tool-holding member.

* * * * *

UNITED STATES PATENT AND TRADEMARK OFFICE
CERTIFICATE OF CORRECTION

PATENT NO. : 4,116,098
DATED : Sep. 26, 1978
INVENTOR(S) : Takashi Suzuki; Tsutomu Ikezawa; Kazui Ogasawara It is certified that error appears in the above-identified patent and that said Letters Patent are hereby corrected as shown below:

Column 13, line 18, change "192" to --291--.

Column 16, line 35, change "17" to --9--.

Signed and Sealed this

Thirteenth Day of March 1979

[SEAL]

Attest:

RUTH C. MASON
Attesting Officer

DONALD W. BANNER
Commissioner of Patents and Trademarks